INVENTOR
STANLEY EATON

By William C. Linton
ATTORNEY

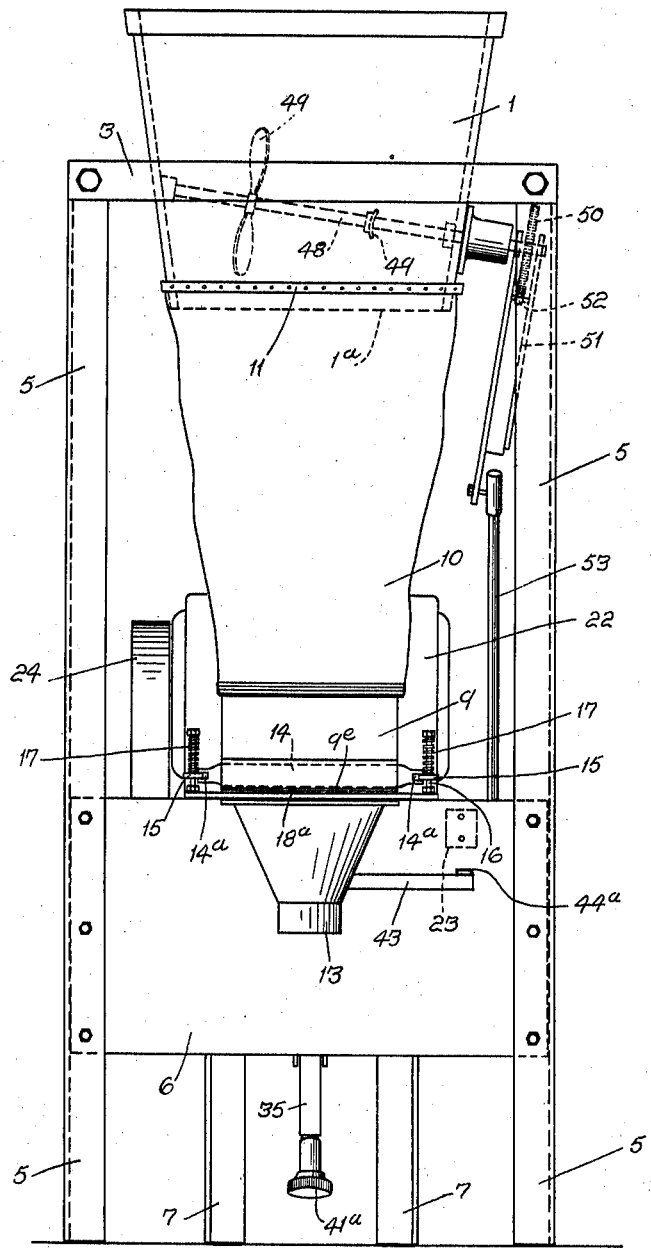

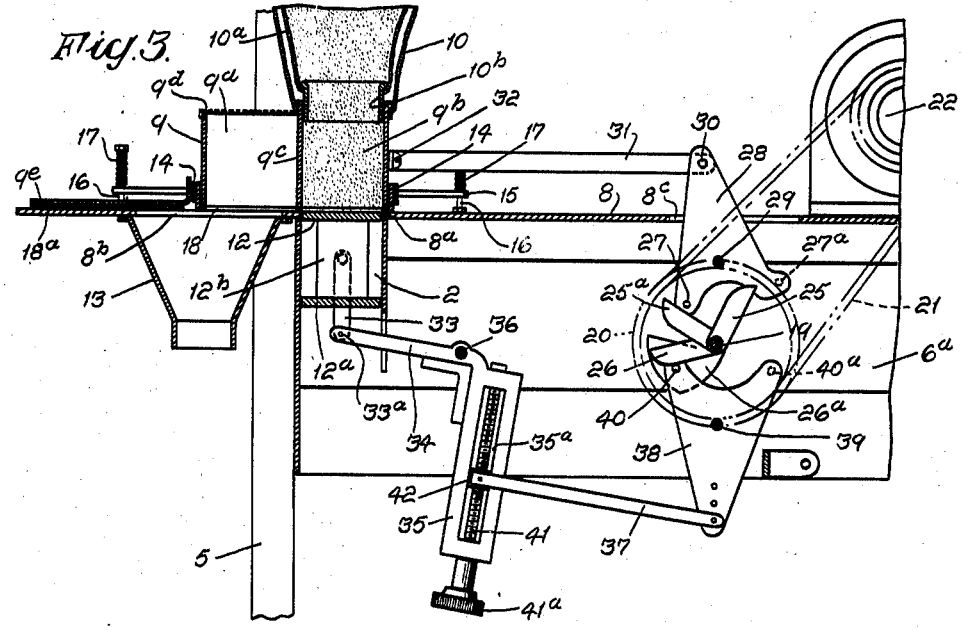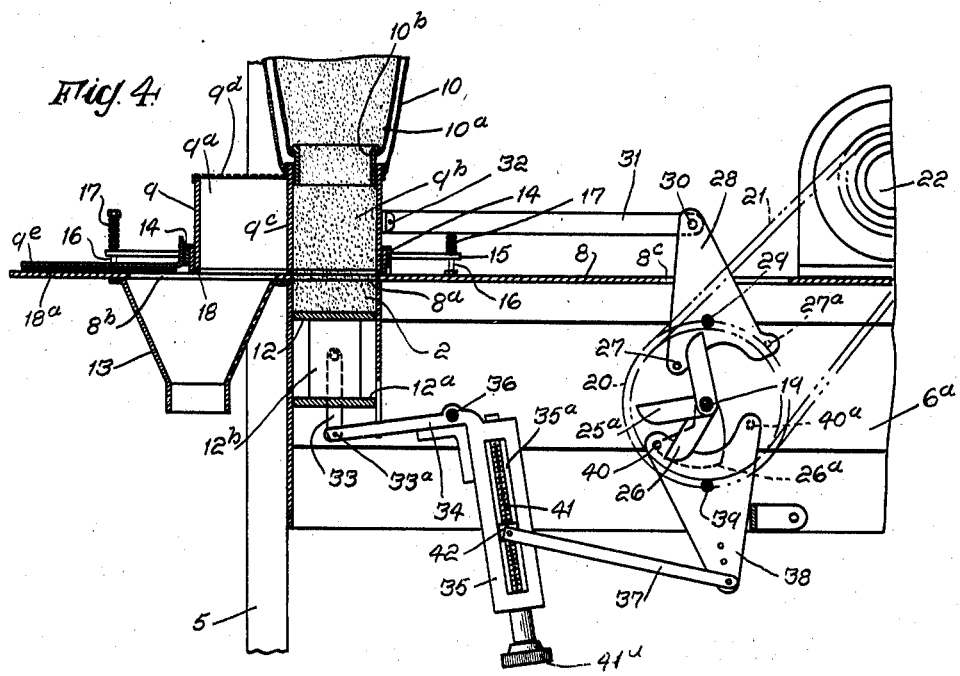

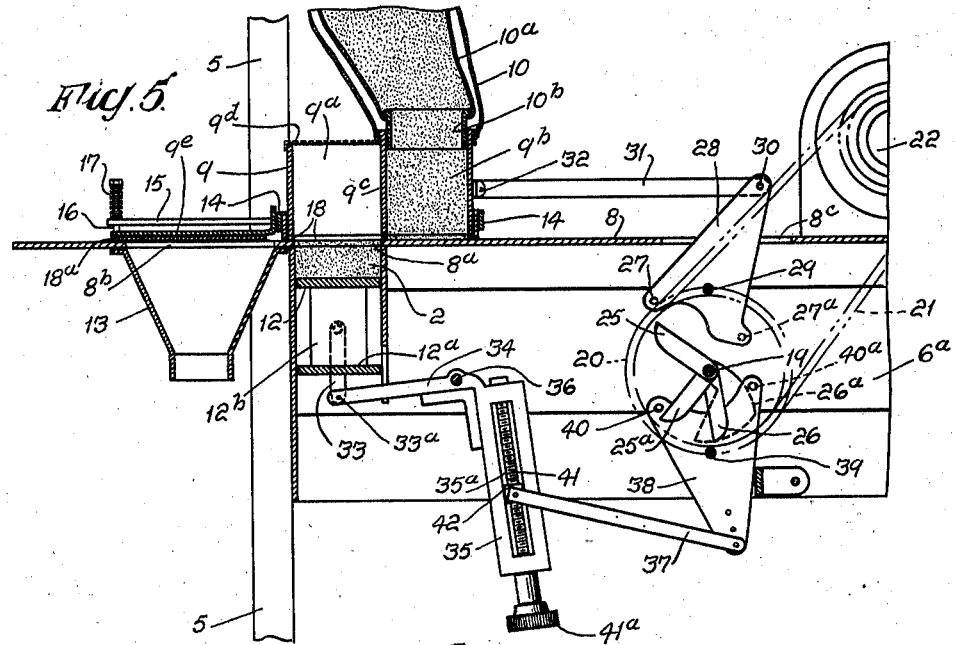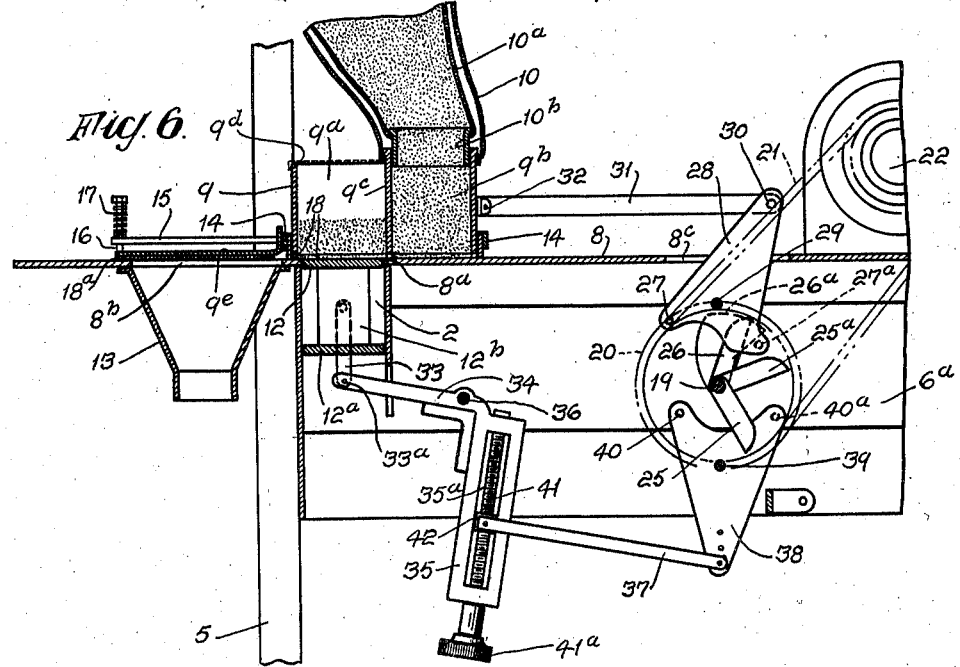

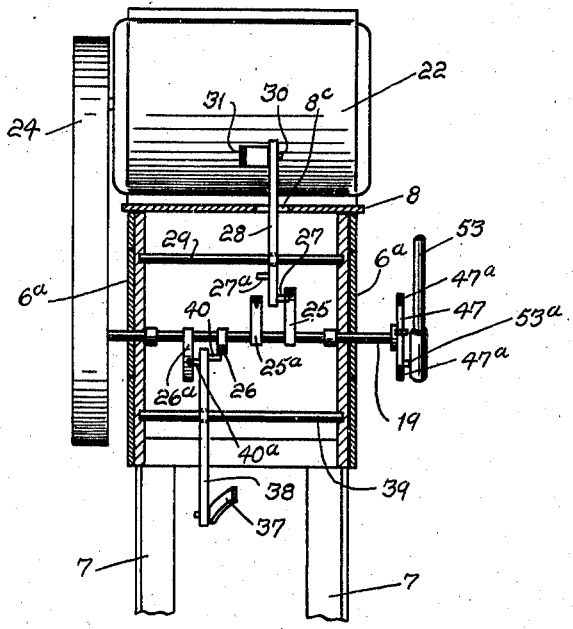

Patented May 3, 1938

2,116,105

UNITED STATES PATENT OFFICE 2,116,105

APPARATUS FOR AUTOMATICALLY DELIVERING PREDETERMINED QUANTITIES OF PULVERULENT OR GRANULAR SUBSTANCE OR MATERIAL

Stanley Eaton, Liverpool, England

Application September 9, 1937, Serial No. 163,140
In Great Britain September 10, 1936

10 Claims. (Cl. 221—105)

This invention relates to apparatus for automatically delivering predetermined quantities of pulverulent or granular substance or material, being particularly applicable for use in the delivery in regular charges or quantities of flour, pulverized salt, and other powdered substance or material not suitable to be fed by gravity; and my invention has for its primary object to provide simple and reliable apparatus for accomplishing the purpose indicated quickly and efficiently.

With the above object in view, an apparatus for automatically delivering predetermined quantities of pulverulent or granular substance or material according to the present invention comprises, in combination, a hopper for containing material in bulk; a measuring chamber having an open top spaced below the hopper; a plunger reciprocably fitted within said measuring chamber; a carriage having a bottomless front compartment and a rear through-passage adapted to alternately register with said open top of the measuring chamber to form a substance-transferrer which is slidably mounted upon a table-like surface provided between said hopper and said measuring chamber; openings in said table-like surface to coincide with said open top of the measuring chamber and a discharge funnel; a displaceable chute connected between an outlet opening of the hopper and said rear through-passage of the substance-transferrer; operating mechanism for reciprocating the substance-transferrer over the table-like surface when the plunger is stationary and for reciprocating the plunger within the measuring chamber when the substance-transferrer is stationary: the arrangement of said operating mechanism and disposition of the parts being such that when the apparatus is in operation the downward stroke of the plunger induces a charge of material from the hopper through said displaceable chute and rear passage of the substance-transferrer into the measuring chamber, the substance-transferrer being then slid rearwardly so that its front compartment is brought into register with the measuring chamber, so that upon the plunger being projected upwardly, flush with the table-like surface, the measured material is raised from the measuring chamber into the front compartment of the substance-transferrer which is then slid forwardly so that the charge of material is permitted to fall through said opening in the table top and through said discharge funnel for packing.

In one embodiment, the timed movements of the substance-transferrer and the plunger are effected by a series of cams arranged to revolve with a rotary operating shaft and intermittently actuate respective rocker arms, one of which being connected to the substance-transferrer whilst the other is connected to the plunger.

Adjusting means may be provided whereby said downward stroke of the plunger can be lengthened or shortened so as to vary the charging capacity of the measuring chamber.

In one convenient construction said substance-transferrer consists of a rectangular box-like structure divided into two compartments by means of a transverse partition, one of said compartments being open at its top and bottom to provide a vertical through-passage, whilst the other compartment is open at the bottom to provide a bottomless chamber, and said compartments being adapted to alternately register with the open top of the measuring chamber.

The substance-transferrer is preferably provided with slotted lateral projections which engage above and below respective guide bars floatingly mounted one on each side of the substance-transferrer on vertical guide rods secured to the table-like surface, the guide rods being fitted with coiled springs the action of which being to impart downward pressure to said guide bars so as to maintain the substance-transferrer in sealing contact with the upper surface of the table-like surface, and in order to ensure this end resilient material may be secured to the underside of the substance-transferrer.

The displaceable chute embodied in the apparatus may be constituted by a single or double-walled canvas chute suitably connected between said outlet opening of the hopper and the open top of said through-passage of the substance-transferrer.

A rotary agitator device may be mounted within the hopper and adapted to be driven step-by-step by pawl and ratchet mechanism operatively connected to a moving member of the apparatus.

Further, a striker device may be arranged to co-act with a projection on said discharge funnel during each discharging operation so as to avoid the likelihood of some of the material from clinging to the interior of the funnel, thus aiding the delivery of regular charges.

I will further describe my invention with the aid of the accompanying sheets of explanatory drawings which illustrate, by way of example only, one mode of carrying the same into effect.

In said drawings:—

Figs. 1 and 2 are side and front elevations, respectively, of an apparatus for the purpose indicated and constructed in accordance with the invention.

Figs. 3, 4, 5, 6, and 7 are side-sectional elevations, but with the major portion of the supply hopper and part of the motor and supporting frame structure broken away, illustrating the apparatus in its successive main positions as during one complete cycle of operation, in which:—

Fig. 3 shows the apparatus in its normal position with the top of the plunger or piston within the measuring chamber flush with the table surface upon which the reciprocable carriage forming a substance-transferrer is slidably mounted.

Fig. 4 shows the fall or downstroke of the plunger which induces a charge of the material through the rear passage of the substance-transferrer into the measuring chamber; during this plunger movement the substance-transferrer is held stationary.

Fig. 5 shows the substance-transferrer slid rearwardly so as to cut-off the measured quantity in the measuring chamber from the supply; in this movement of the substance-transferrer the plunger remains stationary.

Fig. 6 shows the plunger projected upwardly to raise the measured quantity out of the measuring chamber above the level of the table surface, and so that the said quantity is transferred into the forward compartment of the substance-transferrer; during the upward stroke of the plunger the substance-transferrer remains stationary.

Fig. 7 shows the substance-transferrer slid to its forward position—as in Fig. 1—so that the measured quantity, now in the forward compartment of the substance-transferrer, falls through a discharge funnel into the required container or package.

Fig. 8 is a transverse section taken on line 8—8 Fig. 7, and viewed in the direction of the arrows.

In the several views like characters of reference denote like or equivalent parts wherever they occur.

Figure 1:
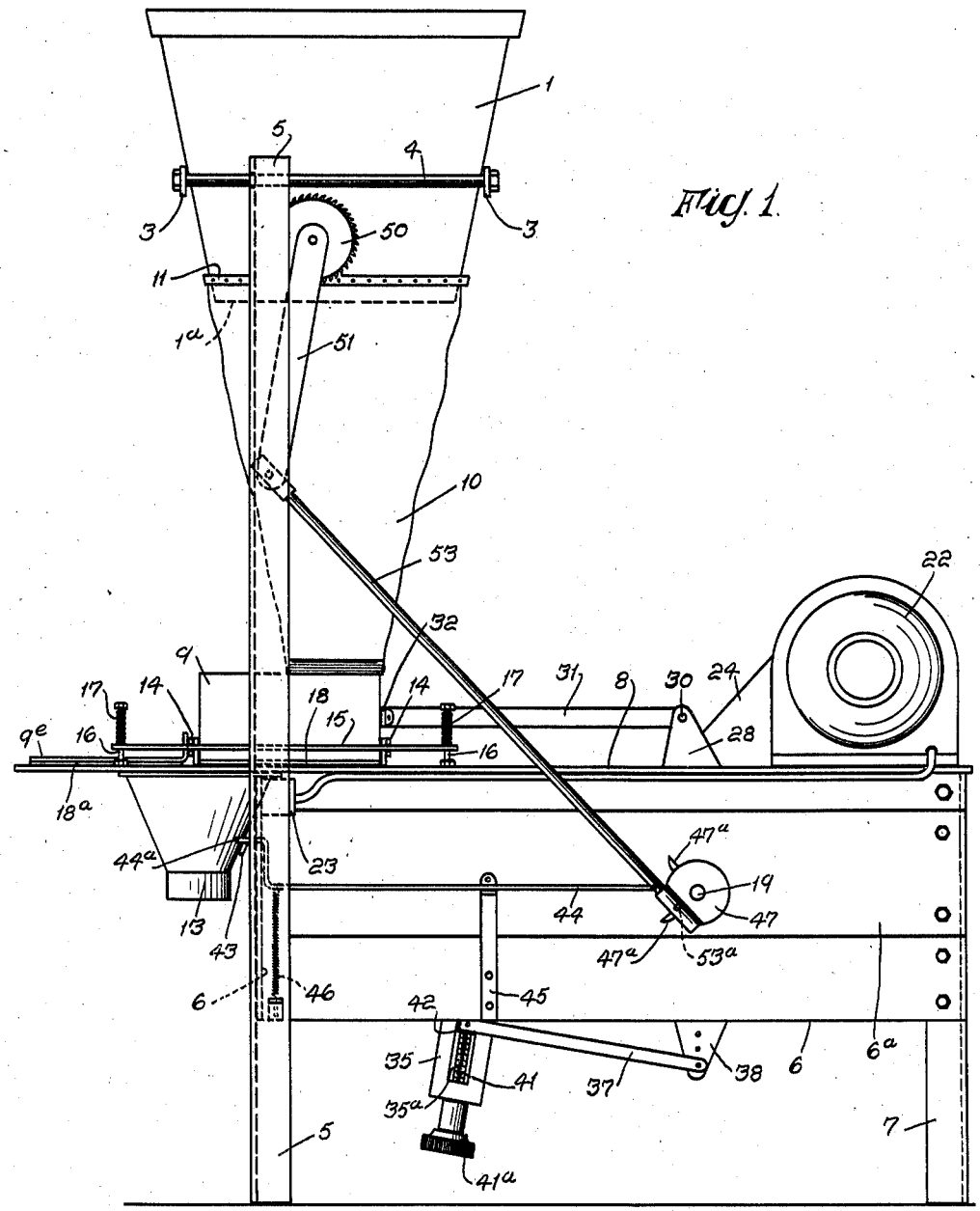

In the apparatus shown in the drawings the reference numeral 1 indicates the hopper proper constructed of wood, or other suitable material, and which is adapted to contain in bulk the material—such as flour, pulverized salt, or other powdered substance or granular material not suitable to be fed by gravity—to be fed out into small regular or predetermined quantities into a measuring chamber 2. The hopper 1 is adapted to communicate at intervals with measuring chamber 2.

Said hopper 1 is supported by cross straps 3 and tie-rods 4 at the top of supporting uprights 5 situated at the front end of a rectangular frame structure which includes a casing 6 and rear upright supports 7; the measuring chamber 2 being enclosed within casing 6 adjacent the front of the frame structure; a middle side portion 6$^a$ of casing 6 may be removed to obtain access to the interior as and when required. To the top of casing 6 there is secured a table, or like flat surface 8 having an opening 8$^a$ coinciding with the open top of measuring chamber 2, and upon which surface 8 there is reciprocally mounted and guided a carriage or discharging element which, in this example, consists of a rectangular box-like structure 9 divided into front and rear compartments 9$^a$, 9$^b$, respectively, by means of a transverse partition or wall 9$^c$ so as to form a substance-transferrer. Said rear compartment 9$^b$ is open at the top and bottom to provide a vertical through-passage, whilst the front compartment 9$^a$ is also open at the bottom but which may, if desired, be closed at its top by means of a removable lid or cover, as indicated at 9$^d$, which may be of meshwork to provide, in effect, a bottomless chamber.

The lower outlet aperture 1$^a$ of hopper 1 and the open top of said through-passage 9$^b$ of substance-transferrer 9 is connected by a canvas or other flexible or pliable chute which, in the apparatus illustrated, comprises an outer casing of canvas 10 secured at its upper end above outlet opening 1$^a$ of hopper 1 by binding strips 11 as shown in Figs. 1 and 2, and suitably fastened at its lower end below an upper rim portion of rear compartment 9$^b$ of substance-transferrer 9, and an inner canvas chute 10$^a$ is also secured at its top by strips 11 to hopper 1 and carries at its bottom end a metal reinforcement member 10$^b$ which loosely hangs within the open top of the through-passage 9$^b$ of substance-transferrer 9.

A piston or plunger construction comprising upper and lower plates 12, 12$^a$, respectively, with intermediate block 12$^b$ is fitted within measuring chamber 2 so that when plunger 12, 12$^a$, 12$^b$ is in its uppermost position, as in Fig. 3, the uppermost plate member 12 lies within the corresponding opening 8$^a$ in the table top 8 so as to be flush with the upper surface thereof. To the underside of the table top 8 there is fitted a discharge funnel 13 which is secured directly below a discharge opening 8$^b$ provided at the forward end of table top 8.

Transversely disposed at the bottom edges of the front and rear of substance-transferrer 9 there are secured rigid strips 14 which have their ends extending beyond the vertical edges of the substance-transferrer and are slotted at 14$^a$ so as to engage above and below respective guide bars 15 floatingly mounted one on each side of transferrer 9, on vertical guide rods 16 secured to the upper side of the table top. The guide rods 16 are fitted with coiled springs 17 the action of which being to impart downward pressure to said guide bars 15 and so slotted strips 14, 14$^a$ in order to maintain the bottom of substance-transferrer 9 in sealing contact with the upper surface of table top 8, and in order to ensure this object, strips of felt, leather, or other resilient material, are positioned at 18 at the bottom of the substance-transferrer so as to prevent the powdered substance from passing thereunder when the apparatus is being operated. The front end of substance-transferrer 9 is also provided with a forward extension 9$^e$ which has on its underside a flat piece of felt or other resilient material 18$^a$. Said forward extension 9$^e$ serves as a cover for the table opening 8$^b$ which coincides with discharge funnel 13.

In use, upon the fall or downstroke of the plunger 12, 12$^a$, 12$^b$, as at the commencement of a charging operation, the powdered material from hopper 1 is induced through the substance-transferrer 9 by way of the canvas or other flexible chute 10, 10$^a$ into measuring chamber 2, said through-passage 9$^b$ of the substance-transferrer now being in register therewith, whilst the transferrer 9 is then slid in a rearward direction so that its bottomless compartment 9$^a$ is moved directly over the open top of measuring chamber 2 (during this movement the bottom leading edge of partition 9ᶜ levels the material contained in measuring chamber 2 flush with the table surface 8) whereupon said plunger 12, 12ᵃ, 12ᵇ in chamber 2 is projected upwardly to carry or raise the charge of material contained in chamber 2 into the now registering bottomless compartment 9ᵃ; the transferrer 9 is then slid in the forward direction so that the open bottom of said latter compartment 9ᵃ registers with table opening 8ᵇ and the charge of material falls through discharge funnel 13 into a required package or container placed thereunder.

It will be appreciated that upon each downward stroke of the plunger 12, 12ᵃ, 12ᵇ a suction effect is created which effectively induces into the measuring chamber 2 successive charges of material from hopper 1, such feeding operation being assisted to a certain extent by gravity.

During reciprocation of the transferrer 9 and due to the resultant shaking effect imparted thereto by suitable operating mechanism associated therewith, as later described, powdered material such as flour, is effectively discharged in uniform quantities.

In the example illustrated, the requisite reciprocation of the substance-transferrer 9 and plunger 12, 12ᵃ, 12ᵇ relative to each other is effected by an operating cam shaft 19 revolubly mounted in transverse position between opposite sides of casing 6, and to which shaft 19 is secured a sprocket wheel 20 driven by a chain 21 connected to an electric motor 22 mounted upon table 8 and adapted to be set in motion by a switch 23 located on casing 6 at the front of the apparatus; sprocket wheel 20 and chain 21 are housed within a guard casing 24: the operating shaft 19 is fitted with a series of cams 25, 25ᵃ and 26, 26ᵃ.

The cams 25, 25ᵃ are pre-set to co-act with respective lateral pin projections 27, 27ᵃ secured at the lower end of a rocker arm 28 pivoted on a shaft 29 and having its upper end passing through a slot 8ᶜ in table 8 and pivotally connected at 30 to a link 31; the other end of link 31 is connected at 32 to the rear of substance-transferrer 9. The reciprocation of the plunger 12, 12ᵃ, 12ᵇ within measuring chamber 2 is effected by a vertical link 33 having its upper end pivotally secured to the plunger block 12ᵇ and its lower end pivotally connected at 33ᵃ to one arm 34 of a bell-crank lever 34, 35 pivoted on a transverse shaft 36 and having its other arm 35 adjustably secured to a connecting link 37 pivotally anchored at its opposite end to the lower end of a rocker arm 38 pivoted on a transverse shaft 39 and having its upper end fitted with pin projections 40, 40ᵃ adapted to respectively co-act with the cams 26, 26ᵃ whereby plunger 12, 12ᵃ, 12ᵇ is reciprocated so as to correspond with the movements of substance-transferrer 9 as before described.

The capacity of measuring chamber 2 may be varied or adjusted to suit different requirements or materials by pre-setting the downward stroke of the plunger so that the same may be lengthened or shortened. In the apparatus illustrated this is effected by turning a hand knob 41ᵃ of a screw-threaded rod 41—situated in a slotted portion 35ᵃ of arm 35—in one direction or the other so as to impart upward or downward motion to a block 42 having a correspondingly screw-tapped passage, and to which block 42 the adjacent end of connecting link 37 is pivotally anchored.

In order to ensure that each charge or measured quantity of the powdered substance is completely delivered through the discharge funnel and so as to avoid the likelihood of some of the powdered material clinging to the interior thereof, I secure to funnel 13 a lateral arm extension 43 which has its outer end adapted to co-act with a striker member 44 fulcrumed at the top of a bar 45 secured to casing 6 and having a coiled spring 46 anchored to its forward end so as to normally maintain the hammer part 44ᵃ of striker member 44 in contact with the funnel arm 43.

The arrangement of the striker device 44, 44ᵃ is such that when spaced teeth 47ᵃ carried by a rotary disc 47 driven by operating shaft 19 press the rear end of the pivotal striker member 44 downward its forward end is raised and when each tooth 47ᵃ leaves the rear end of striker member 44 the coiled spring 46 brings the hammer part 44ᵃ rapidly downward so that the latter imparts a sharp blow upon the arm 43 of funnel 13, thus having the effect of shaking any powdered substance that may be adhering within the funnel; the positioning of the teeth 47ᵃ is such that the latter act upon the striker member at and during each discharging stroke.

It will be obvious that any other suitable operative interconnection may be effected between the substance-transferrer 9 and plunger 12, 12ᵃ, 12ᵇ to effect the requisite relative movements of these parts as hereinbefore described; moreover, the apparatus may be operated from any suitable power transmission, or it may be adapted for manual operation, as by a foot pedal or hand lever.

An automatic or power operated agitator device may be rotatably disposed in the hopper 1 adjacent the outlet aperture 1ᵃ thereof or any other convenient situation, in order to ensure the free flow of material to the measuring chamber. The agitator device shown in the drawings comprises a shaft 48 rotatably mounted between opposite sides of hopper 1 and carrying two two-bladed propellors each designated 49 spaced apart but set at right-angles to each other. An end of said shaft 48 projects through a side of hopper 1 and is fitted with a toothed ratchet wheel 50 whereto is secured a link 51 carrying a suitable spring-returned pawl 52 engaging with ratchet wheel 50. The bottom end of arm 51 is pivotally connected to the upper end of a connecting rod 53 the lower end of which is revolubly anchored at 53ᵃ to the rotary disc 47 driven by the operating shaft 19.

In use, the connecting rod 53 oscillates the link 51 so that its pawl 52 imparts step-by-step one way rotary movement to wheel 50 and so the propellors 49 within hopper 1.

In lieu of the canvas or other flexible chute before described, a sheet metal chute or tube may have its upper end enclosing and pivotally connected to the outlet aperture 1ᵃ of hopper 1 whilst its lower end may register with, and be located within, the open end of the through-passage 9ᵇ of substance-transferrer 9 in such manner as to follow the movements thereof during reciprocation.

What I claim as my invention and desire to secure by Letters Patent is:—

1. Apparatus for automatically delivering predetermined quantities of pulverulent or granular substance or material comprising, in combination, a hopper for containing material in bulk; a measuring chamber having an open top spaced below the hopper; a plunger reciprocably fitted within said measuring chamber; a carriage having a bottomless front compartment and a rear through-passage adapted to alternately register with said open top of the measuring chamber to form a substance-transferrer which is slidably mounted upon a table-like surface provided between said hopper and said measuring chamber; openings in said table-like surface to coincide with the open top of the measuring chamber and a discharge funnel; a displaceable chute connected between an outlet opening of the hopper and said rear through-passage of the substance-transferrer; operating mechanism for reciprocating the substance-transferrer over the table-like surface when the plunger is stationary and for reciprocating the plunger within the measuring chamber when the substance transferrer is stationary: the arrangement of said operating mechanism and disposition of the parts being such that when the apparatus is in operation the downward stroke of the plunger induces a charge of material from the hopper through said displaceable chute and rear passage of the substance-transferrer into the measuring chamber, the substance-transferrer being then slid rearwardly so that its front compartment is brought into register with the measuring chamber, so that upon the plunger being projected upwardly, flush with the table-like surface, the measured material is raised from the measuring chamber into the front compartment of the substance-transferrer which is then slid forwardly so that the charge of material is permitted to fall through said opening in the table top and through said discharge funnel for packing.

2. Apparatus for automatically delivering predetermined quantities of pulverulent or granular substance or material as claimed in the preceding claim, wherein the timed movements of the substance-transferrer and the plunger are effected by a series of cams arranged to revolve with a rotary operating shaft and intermittently actuate respective rocker arms, one of which being connected to the substance transferrer whilst the other is connected to the plunger.

3. Apparatus for automatically delivering predetermined quantities of pulverulent or granular substance or material as claimed in the preceding claim 1, and adjusting means whereby said downward stroke of the plunger can be lengthened or shortened so as to vary the charging capacity of the measuring chamber.

4. Apparatus for automatically delivering predetermined quantities of pulverulent or granular substance or material as claimed in the preceding claim 1, wherein said substance-transferrer consists of a rectangular box-like structure divided into two compartments by means of a transverse partition, one of said compartments being open at its top and bottom to provide a vertical through-passage whilst the other compartment is open at the bottom to provide a bottomless chamber, and said compartments being adapted to alternately register with the open top of the measuring chamber.

5. Apparatus for automatically delivering predetermined quantities of pulverulent or granular substance or material as claimed in the preceding claim 1, wherein the substance-transferrer is provided with slotted lateral projections which engage above and below respective guide bars floatingly mounted one on each side of the substance-transferrer on vertical guide rods secured to the table-like surface, the guide rods being fitted with coiled springs the action of which being to impart downward pressure to said guide bars so as to maintain the substance-transferrer in sealing contact with the upper surface of the table-like surface.

6. Apparatus for automatically delivering predetermined quantities of pulverulent or granular substance or material as claimed in the preceding claim 1, wherein the underside of the substance-transferrer which contacts with the table-like surface is fitted with resilient material, for the purpose specified.

7. Apparatus for automatically delivering predetermined quantities of pulverulent or granular substance or material as claimed in the preceding claim 1, wherein said displaceable chute is constituted by a canvas chute connected between the outlet opening of the hopper and the open top of said through-passage of the substance-transferrer.

8. Apparatus for automatically delivering predetermined quantities of pulverulent or granular substance or material as claimed in the preceding claim 1, wherein said displaceable chute is constituted by a double walled canvas chute connected between the outlet opening of the hopper and the open top of said through-passage of the substance-transferrer.

9. Apparatus for automatically delivering predetermined quantities of pulverulent or granular substance or material as claimed in the preceding claim 1, wherein a rotary agitator device is mounted within the hopper and adapted to be driven step-by-step by pawl and ratchet mechanism operatively connected to a moving member of the apparatus.

10. Apparatus for automatically delivering predetermined quantities of pulverulent or granular substance or material as claimed in the preceding claim 1, wherein a striker device is arranged to co-act with a projection on said discharge funnel during each discharging operation so as to avoid the likelihood of some of the material from clinging to the interior of the funnel, thus aiding the delivery of regular charges.

STANLEY EATON.